United States Patent [19]

Habermehl

[11] Patent Number: 5,956,701
[45] Date of Patent: Sep. 21, 1999

[54] METHOD AND SYSTEM FOR USING AN ARTIFICIAL NEURAL NET FOR IMAGE MAP PROCESSING

[75] Inventor: Paul Robert Habermehl, Round Rock, Tex.

[73] Assignee: International Business Machines Corporation, Armonk, N.Y.

[21] Appl. No.: 08/874,530

[22] Filed: Jun. 13, 1997

[51] Int. Cl.[6] .............................. G06F 19/00; G06T 1/40
[52] U.S. Cl. ............................................................ 706/20
[58] Field of Search .................... 706/20, 27, 16

[56] References Cited

U.S. PATENT DOCUMENTS

| | | | |
|---|---|---|---|
| 5,048,100 | 9/1991 | Kuperstein | 382/157 |
| 5,161,204 | 11/1992 | Hutcheson et al. | 382/157 |
| 5,185,857 | 2/1993 | Rozmanith et al. | 707/507 |
| 5,220,640 | 6/1993 | Frank | 706/20 |
| 5,274,714 | 12/1993 | Hutcheson et al. | 382/157 |
| 5,295,197 | 3/1994 | Takenga et al. | 382/158 |
| 5,420,939 | 5/1995 | DaSilva | 382/181 |
| 5,465,308 | 11/1995 | Hutcheson et al. | 382/159 |
| 5,479,573 | 12/1995 | Keeler et al. | 706/21 |
| 5,497,430 | 3/1996 | Sadovnik et al. | 382/156 |
| 5,500,905 | 3/1996 | Martin et al. | 382/157 |
| 5,515,477 | 5/1996 | Sutherland | 706/41 |
| 5,524,175 | 6/1996 | Sato et al. | 706/41 |
| 5,659,692 | 8/1997 | Poggio et al. | 345/330 |
| 5,703,965 | 12/1997 | Fu et al. | 382/232 |
| 5,727,129 | 3/1998 | Barrett et al. | 706/10 |
| 5,742,700 | 4/1998 | Yoon et al. | 382/132 |
| 5,754,938 | 5/1998 | Herz et al. | 455/4.2 |
| 5,761,344 | 6/1998 | Al-Hussein | 382/237 |
| 5,765,028 | 6/1998 | Gladden | 706/25 |

OTHER PUBLICATIONS

"Pattern Recognition Method for Personal Computers," *IBM Technical Disclosure Bulletin*, vol. 38, No. 01, 509–512 (Jan. 1995).

*Primary Examiner*—Robert W. Downs
*Attorney, Agent, or Firm*—Sawyer & Associates; Casimer K. Salys

[57] ABSTRACT

The present invention provides a method and system for processing an image, the method comprising the steps of providing an image and specifying a portion of the image. The present invention also includes utilizing an artificial neural net to associate the portion of the image with an application, wherein a plurality of positions are selected within the specified portion of the image.

12 Claims, 6 Drawing Sheets

METHOD AND SYSTEM FOR USING AN ARTIFICIAL NEURAL NET FOR IMAGE MAP PROCESSING

FIELD OF THE INVENTION

The present invention relates generally to image map processing, particularly to a system and method for using an artificial neural net for associating a portion of an image with an application such as those which can be accessed through an Internet link.

BACKGROUND OF THE INVENTION

As the use of the Internet gains popularity, an unprecedented number of users are now performing more complex computer functions. For example, numerous users are creating their own home page for access via the Internet. As part of their home page, many users are utilizing internet links from one subject to another subject. A typical link is, for example, a link which associates a first application with another application. For example, if the user is viewing a map of a county, the user may select a city which includes links to more information regarding the selected city.

When a portion of an image is selected for a link, the portion of the image which is associated with the linked application must initially have been properly identified. For example, if a city is selected to be linked to other information, then the boundaries of the city typically are required to be defined to allow the user to select any portion of the city in order to initiate the link.

If the shape of the portion of the image is a simple geometric shape, such as a city with its boundary in the shape of a rectangle, then it is relatively simple to identify the boundary for the portion of the image. However, if the portion of the image is shaped in a complex shape, then many data points are required to define the shape of the boundary of the portion of the image. This identification of the boundary of a selected portion of the image can be very tedious to the programmer when the programmer attempts to identify the portion of the image which is to be utilized for future linking with another application.

Another problem with the conventional method of identifying a boundary of a portion of an image occurs when a first portion of the image and a second portion of the image are each respectively to be linked with a first application and a second application. If the first and second portions share a boundary, then the conventional identifying method typically requires the shared boundary to be defined twice: once for the first portion and another for the second portion. Accordingly, duplicity of identification of a boundary is required for this circumstance.

Accordingly, what is needed is a method and system for identifying a portion of an image to be associated with another application, wherein the method and system are easier for the programmer to apply. The present invention addresses such a need.

SUMMARY OF THE INVENTION

The present invention provides a method and system for processing an image, the method comprising the steps of providing an image and specifying a portion of the image. The present invention also includes utilizing an artificial neural net to associate the portion of the image with an application, wherein a plurality of positions are selected within the specified portion of the image.

DESCRIPTION OF THE INVENTION

The present invention relates to a method and system for image map processing. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
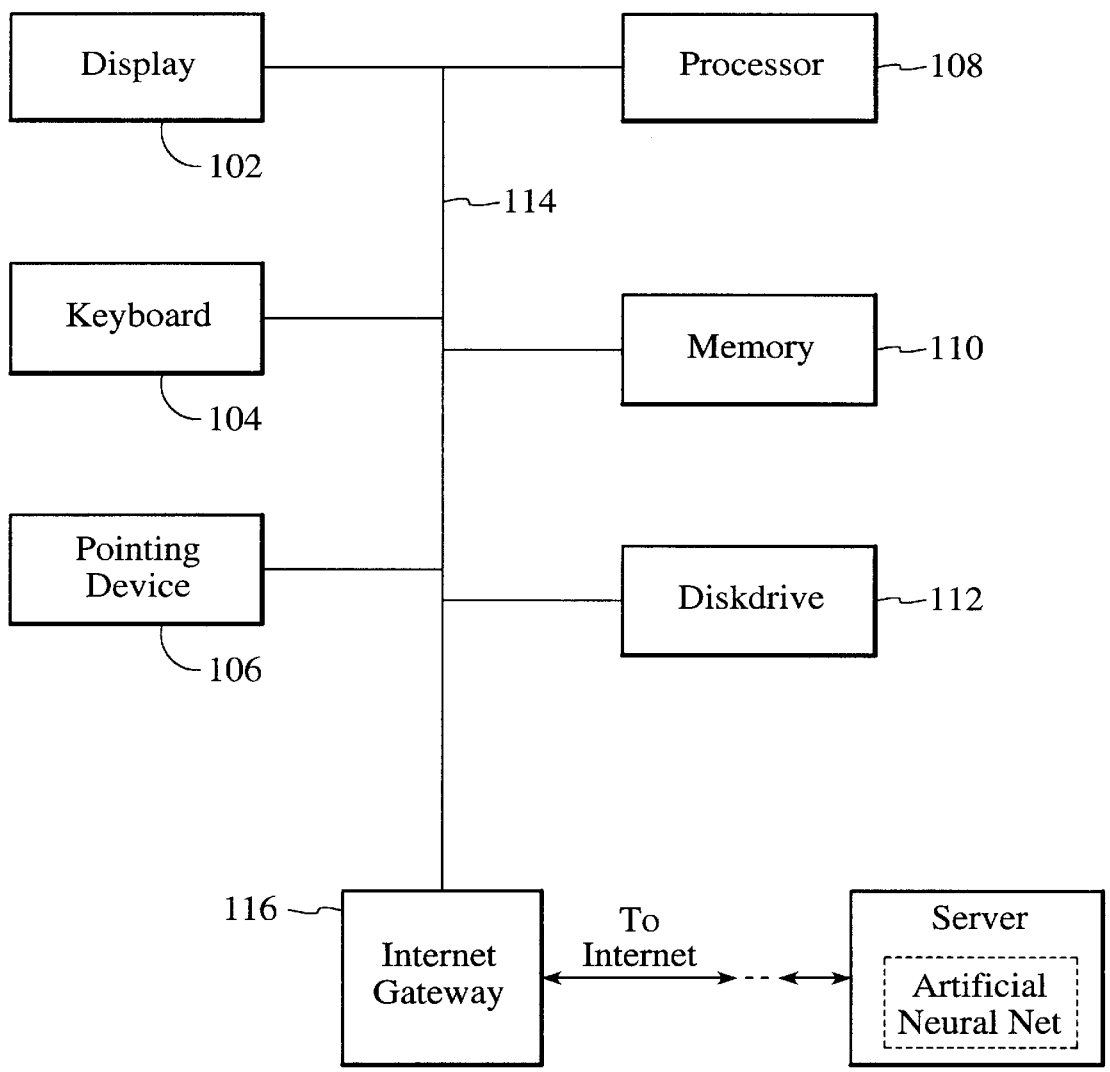
FIG. 1 is a block diagram of a system in which the present invention can reside.

FIG. 1 shows a block diagram of a system in which the present invention can reside. The system includes a display 102, a keyboard 104, a pointing device 106, a processor 108, a memory 110, a disk drive 112, and an Internet gateway 116, all coupled together by the system bus 114.

Figure 2:
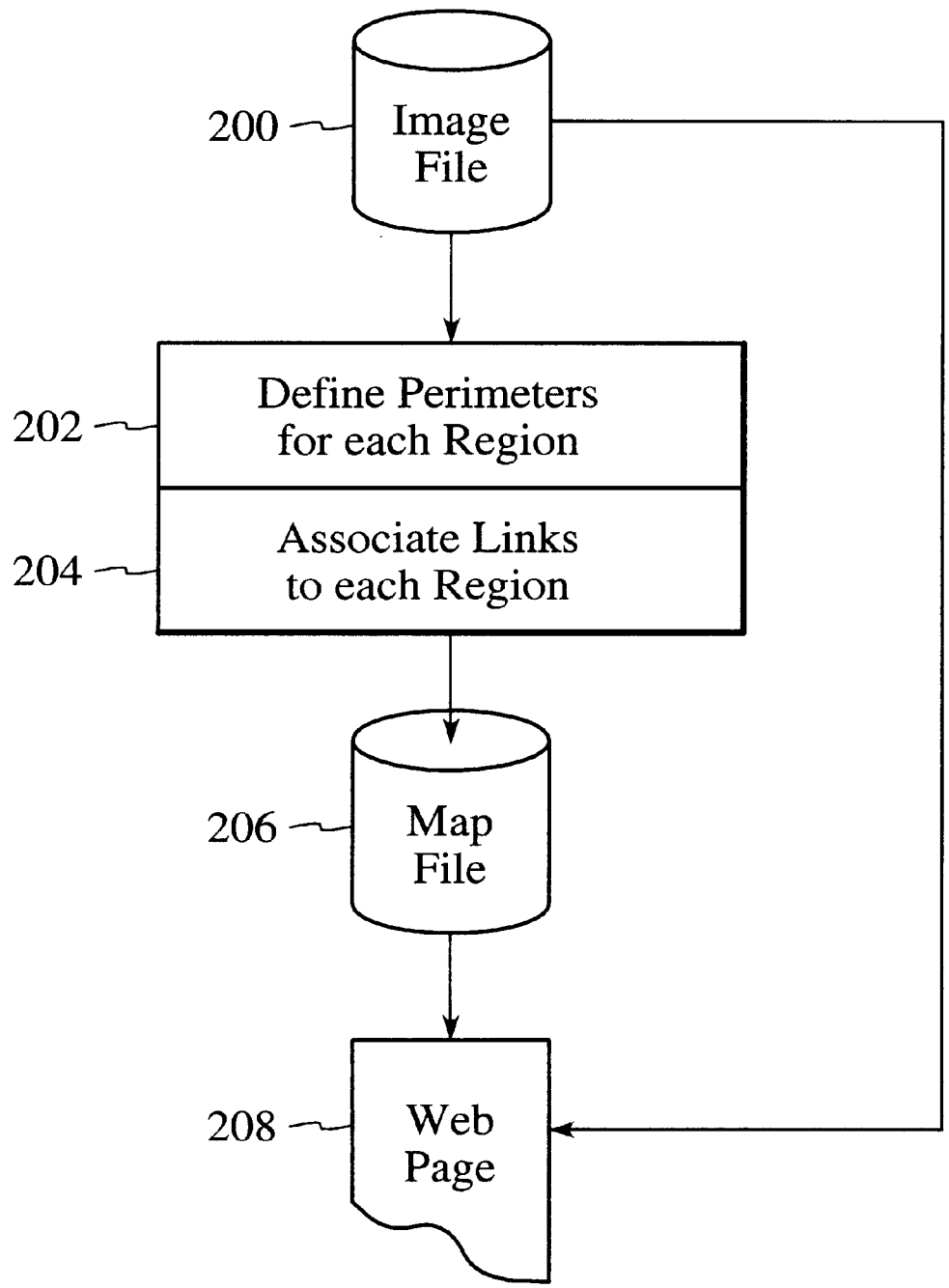
FIG. 2 is a flow diagram of a conventional method for defining perimeters of a portion of an image.

FIG. 2 shows a flow diagram of a conventional method for defining a portion of an image for purposes such as providing a link to another application, such as an Internet site. The image file is provided via step 200. The parameters for each region are defined via step 202. Associations, such as Internet links, are associated to each defined region via step 204. The file of associated links is then mapped via step 206 which can later be accessed from the web page via step 208.

Figure 3:
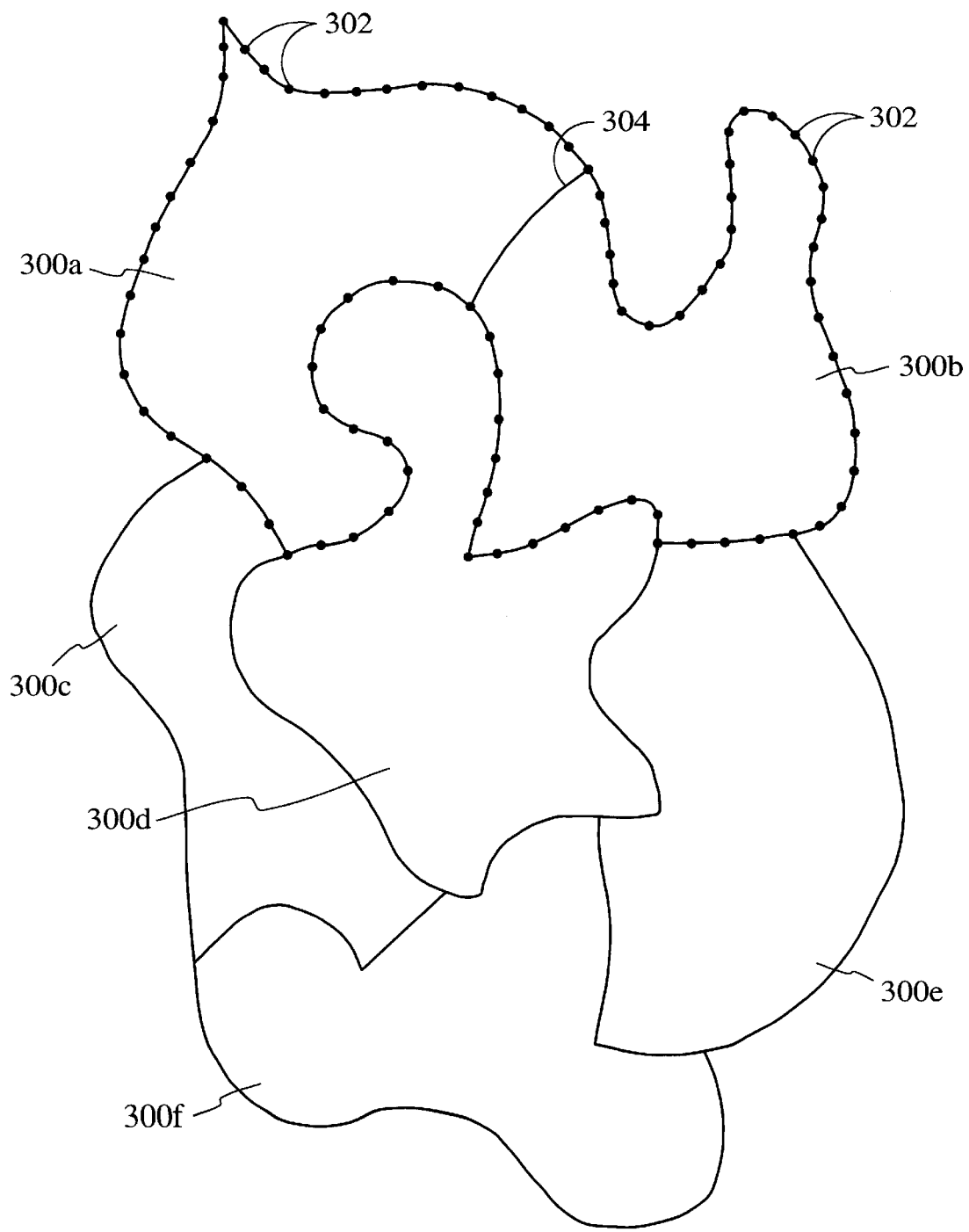
FIG. 3 is an example of an image with perimeters of portions of the image having been defined according to the conventional method shown in FIG. 2.

FIG. 3 shows an illustration of an example of an image with portions of the image defined according to the conventional method shown in FIG. 2. Regions 300a–300e are shown within the image. Perimeters of the region, such as regions 300a and 300b, are typically defined by identifying the perimeters with (x,y) inputs 302. If the portion of the image is a simple geometric figure, such as a rectangle, few (x,y) inputs are required since a straight line may be drawn between two separate inputs. However, for more complex images and regions, numerous separate inputs are typically required to define a perimeter which consists of curves or jagged edges. Inputting a large number of (x,y) inputs is tedious for the programmer since the number of (x,y) inputs becomes more time consuming for a programmer as the number of inputs increases.

Additionally, boundaries 304 which are shared between two regions which are to be defined typically need to be defined twice: once for the first region 300a and another time for the second region 300b.

What is needed is a system and method for defining portions of an image which require fewer inputs and less redundancy. The present invention addresses such a need.

Figure 4:
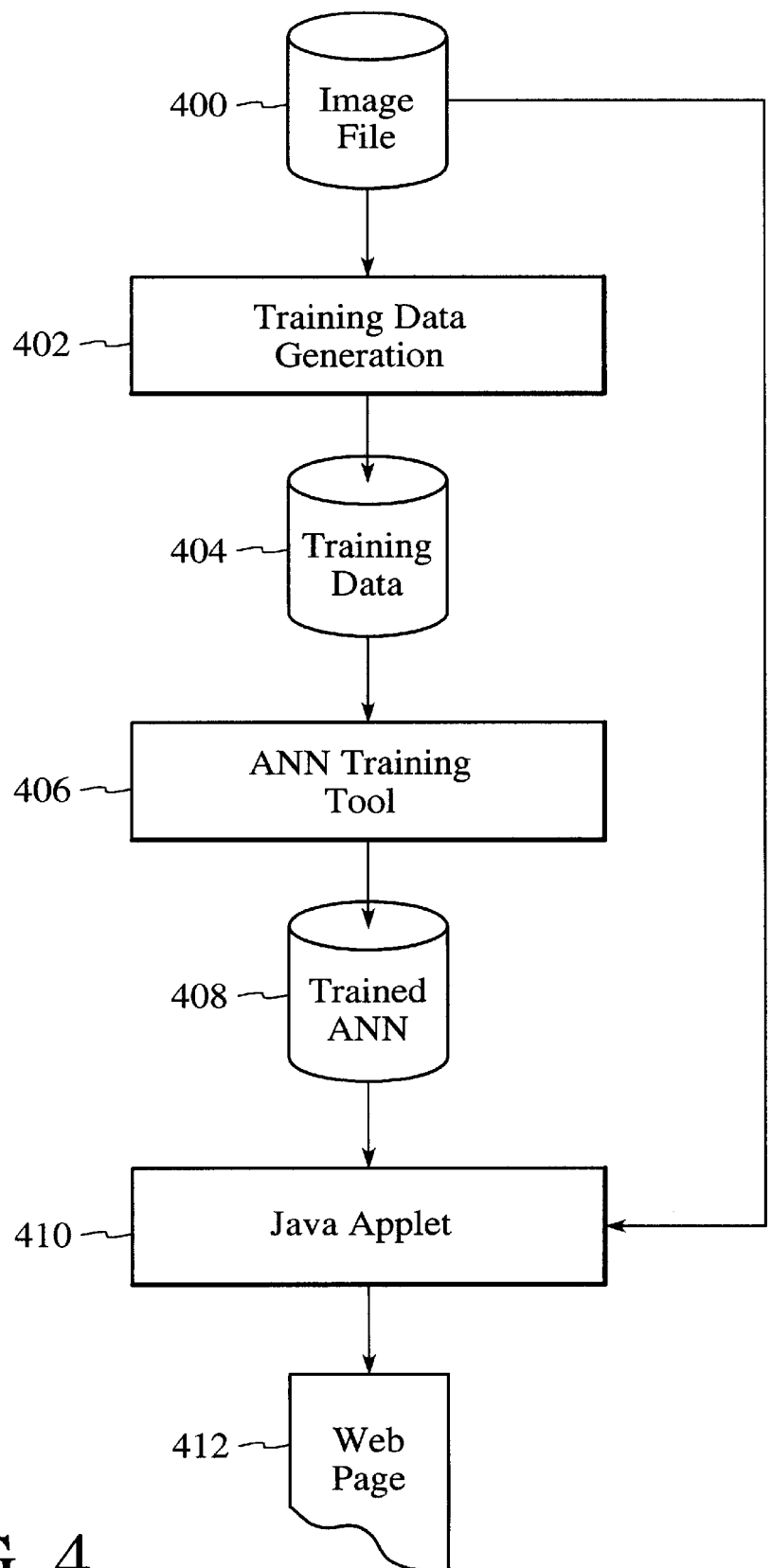
FIG. 4 is a flow diagram of a method according to the present invention for defining a portion of an image.

FIG. 4 shows a flow diagram of a method according to the present invention for defining a portion of an image for purposes such as associating the portion of the image with an application such as a link to an Internet file. The image file is provided via step 400. The image file can be any image file format including GIF file or JPEG file. Training data can be generated via step 402, and provided via step 404. The training data can be generated by selecting various locations within the selected portion of the image by, for instance, clicking a pointing device, such as a mouse, within the portion of the image.

An artificial neural net training tool is then utilized via step 406. Artificial neural net (ANN) training tools are well known to those skilled in the art. The artificial neural net is trained via step 408 and the results can be utilized via an application such as a Java applet via step 410. This information can then later be accessed via an application such as a web page via step 412.

Figure 5:
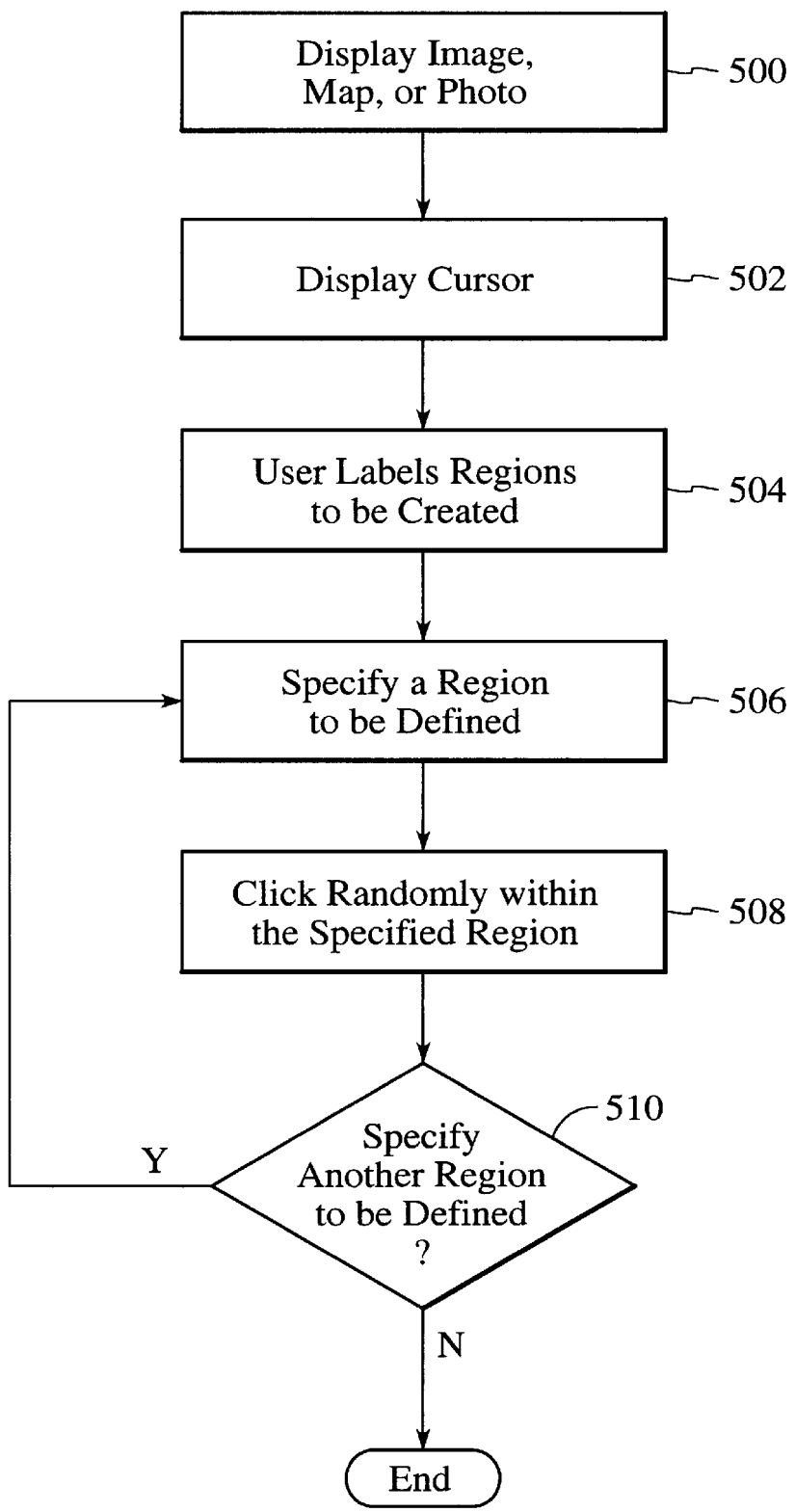
FIG. 5 is a more detailed flow diagram of a portion of the method according to the present invention shown in FIG. 4.

FIG. 5 shows a more detailed flow diagram of an example of steps 402–408 of FIG. 4. The image, map, or photo is displayed via step 500. A cursor is also displayed via step 502. The user then labels regions of the image to be created via step 504. The labeling of regions can be as simple as listing identifiers to be associated to particular regions. A region to be defined is specified via step 506. An example of specifying a region is to identify one of the labels the user created via step 504.

The user then defines the specified region by selecting points within the region by performing an act such as randomly clicking an input device such as a mouse, associated with a cursor, within the specified region. The more times the user clicks in the region, the better defined the region will be. An example of the number of clicks required will be 3 or 4 clicks to define convex or concave areas of the region. The clicks utilized in the internal portion of the region can be sparse while the number of clicks closer to the boundary of the region is preferred to be more concentrated. The concentration of the number of clicks in any given region or in a portion of the region depends on the complexity of the region itself. For example, a boundary which is more complex will require a larger number of clicks than a boundary which is relatively simple. For instance, a portion of a region where the boundary includes a tight curve next to a series of waves and peaks is preferred to have a higher density of clicks than a portion of the region with a substantially straight line. The higher the density of clicks, the more accurate the definition of the region will be.

The region can also be identified with training data other than clicks, such as scribbles caused by the mouse. If a continuous motion, such as scribbles, are used, then it is preferred to use a sampling of (x,y) inputs. For instance, one (x,y) input can be used out of every 10 or 100 (x,y) inputs within a portion of a scribble.

The user indicates a name of a region to be specified. The user can then input data, by a method such as clicking a pointing device, within a region to identify the region which has been named. The inputs train an artificial neural net which can be located in a server. The various inputs within a region can be utilized by an artificial neural net to define the region and store the definition of the region to later be accessed. An application of the data derived via the artificial neural net is allowing a user to select any portion of a region within a map to link to additional information linked to that region.

After the training data is generated for a specific region via step 508, it is determined if another region is to be defined via step 510. If so, then the region to be defined is specified via step 506 and more training data is generated to define the specified region via step 508. After all training data is generated, the neural net algorithm uses the data to train the artificial neural net.

Figure 6:
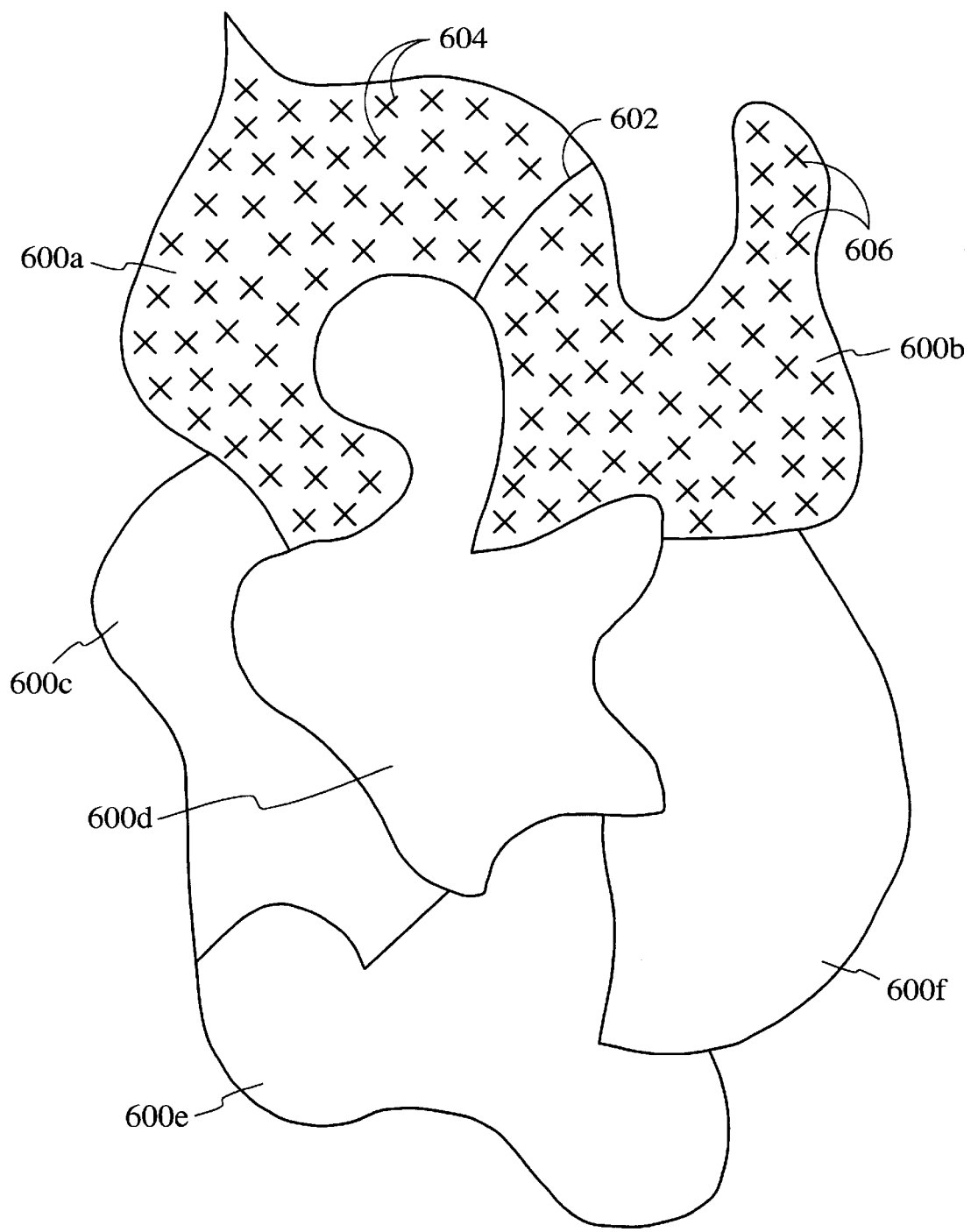
FIG. 6 illustrates an example of portions of an image identified via the method according to the present invention.

FIG. 6 is an illustration of an example of an image with portions defined according to the present invention. The image is shown with various regions 600*a*–600*f* with region 600*a* and 600*b* having been defined via inputs 604, which may be derived from clicks of the mouse connected to the cursor or scribbles within the selected region of the image. Note that the boundary 602 shared between defined regions 600*a* and 600*b* need not be defined twice since the data inputs do not need to be exactly along the boundary.

This random input of data within a particular region allows a more user friendly method of defining a particular region of an image since the user does not need to identify the exact boundary.

A method and system for using an artificial neural net for image map processing has been disclosed. Software written according to the present invention is to be stored in some form of computer readable medium, such as memory or CD ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing an image, the method comprising the steps of:
   a) providing an image;
   b) specifying a portion of the image to be associated with an application; and
   c) utilizing an artificial neural net to define the portion of the image, wherein a plurality of positions are selected within the portion of the image and wherein the artificial neural net uses the plurality of positions to define the portion of the image.

2. The method of claim 1, wherein the artificial neural net receives information related to the plurality of positions to provide a boundary for the portion of the image.

3. The method of claim 2, wherein the plurality of positions are selected by clicking a pointing device.

4. The method of claim 2, wherein the plurality of positions are selected by scribbling a pointing device.

5. The method of claim 1, wherein the application is accessed via an internet.

6. The method of claim 1, wherein the association is a software link.

7. A system for using an artificial neural net for image map processing, the system comprising:
   a display for displaying an image, the image including a portion to be associated with an application, the portion including a plurality of positions;
   a processor coupled to the display;
   a server which can be coupled with the processor, the server including an artificial neural net which can be trained to define the portion of the image using the plurality of positions.

8. The system of claim 7, wherein the plurality of positions are selected by clicking a pointing device.

9. The system of claim 7, wherein the plurality of positions are selected by scribbling a pointing device.

10. The system of claim 7, wherein the application is accessed via an internet.

11. The system of claim 7, wherein the association is a software link.

12. A method for processing an image, the method comprising the steps of:
   a) providing an image;
   b) specifying a portion of the image to be linked with information via an internet; and
   c) utilizing an artificial neural net to define the portion of the image, wherein a plurality of positions are selected within the specified portion of the image and wherein the artificial neural net uses the plurality of positions to define the portion of the image.

* * * * *